July 1, 1958  H. E. HODGSON  2,841,747
CONTROLLER FOR INDUCTIVE DEVICES
Original Filed April 19, 1950
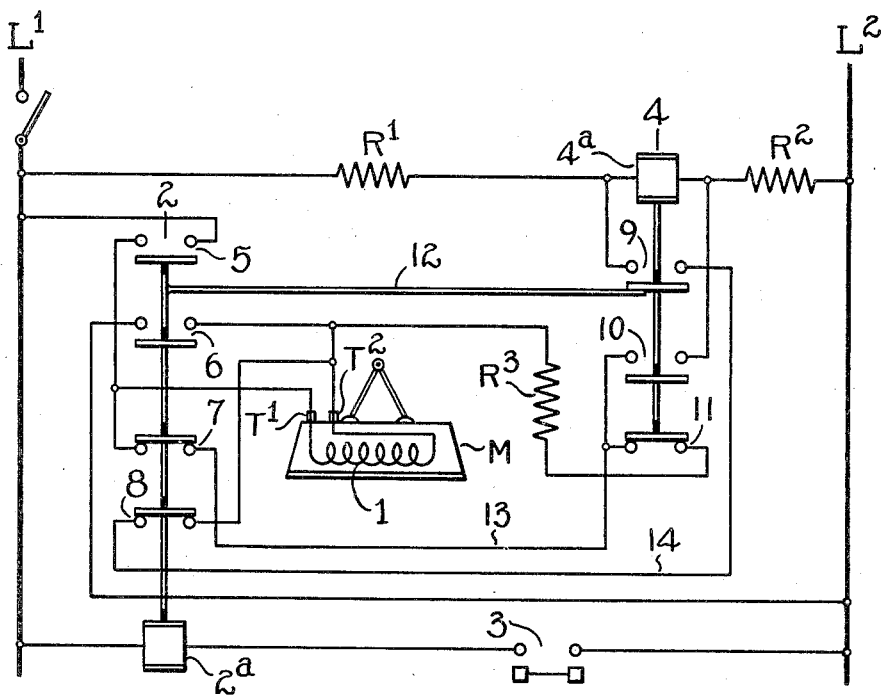
Inventor
Howard E. Hodgson
By W. E. Lyon
Attorney

2,841,747

CONTROLLER FOR INDUCTIVE DEVICES

Howard E. Hodgson, Wauwatosa, Wis.

Continuation of application Serial No. 156,800, April 19, 1950. This application November 26, 1954, Serial No. 471,258

10 Claims. (Cl. 317—123)

This invention relates to controllers for inductive devices, and while not limited thereto is particularly applicable to controllers for inductive devices such as lifting magnets, wherein full and consistently high excitation for picking up a load, and later quick demagnetization for dropping the load are desired.

This application is a continuation of my copending application Serial No. 156,800, filed April 19, 1950, now abandoned.

Lifting magnet controllers are commonly arranged to supply a limited amount of reverse current to the magnet winding when the same is disconnected from the source of supply. The magnet winding is thus allowed to discharge into the supply line, normally through suitable resistors, to prevent damage due to induced voltages, and under the action of the reverse current the magnet flux is quickly reduced to zero value to thereby insure quick dropping of the load. However, such reverse current discharge resistors and their circuits are subject to failure due to heavy currents, rapid heating and cooling of the resistors, severe exposure to vibration and to the elements and the like, which may result in open-circuit condition of the discharge path. Such a condition results in possible damage to the magnet winding and destruction of the control switches due to severe arcing at the contacts.

To remedy this undesired condition, it has heretofore been proposed to place the coil of the main controller switch in series with one or both of the reverse current discharge resistors so that in the event of failure thereof the circuit to the main switch will be disabled and the magnet operator consequently be prevented from re-energizing the magnet winding until appropriate repairs have been made. Among the shortcomings of such proposals are the facts that, first, such schemes do not prevent possible damage should the discharge circuit fail while the magnet winding is energized and carrying a load, and, secondly, systems of the aforementioned type result in much loss of time since the magnet is disabled until repairs can be made as aforeindicated.

An object of the present invention is to provide a controller affording quick and complete demagnetization of the device with the desired protection to the magnet or other inductive device which will at all times be effective and will, upon failure of the main discharge circuit, still permit operation of the magnet, but will simultaneously make known to the magnet operator the fact that the main discharge circuit has failed.

More particularly, an object of the invention is to provide in a controller of the aforementioned character protection for the magnet winding and its controller against destructive induced voltages, by provision of a normally unused, auxiliary discharge circuit which will be operative automatically upon failure of the main or reverse current discharge circuit.

Another object of the invention is to afford an emergency auxiliary discharge circuit for the magnet which will permit further operation of the magnet without damage thereto but which will indicate failure of the main or reverse current discharge circuit by virtue of the fact that the time of dropping the load carried by the magnet is many multiples of that ordinarily expected.

Another object of the invention is to provide a simple control scheme consisting of a few simple elements affording the aforeindicated desired results, and which, upon demagnetization of the controlled device, disconnects it from the energy supply source.

Various other objects and advantages of the invention will hereinafter appear.

The accompanying drawing diagrammatically illustrates an embodiment of the invention which will now be described, it being understood that the embodiment illustrated may be modified without departing from the spirit and scope of the appended claims.

Referring to the drawing, there is illustrated an inductive device M in the form of a lifting magnet having an energizing winding 1 to be supplied with current from a supply circuit indicated by lines $L^1$—$L^2$.

The controller comprises an electroresponsive main switch 2 under the control of a master switch 3 and a second electroresponsive or "drop" switch 4 having a coil or winding $4^a$ connected across lines $L^1$—$L^2$ between the main or reverse current resistors $R^1$, $R^2$, respectively. Switch 2 is provided with normally open contacts 5 and 6 for connecting magnet winding 1 across lines $L^1$—$L^2$ during load lifting operations, and said switch is also provided with normally closed contacts 7 and 8 for establishing connection of the magnet winding 1 to one or the other of the discharge circuits as determined by the condition of switch 4, as will hereinafter be described.

Switch 4 is provided with normally open contacts 9 and 10 for connecting magnet winding 1 through the normally closed contacts 7 and 8 of switch 2 to lines $L^1$—$L^2$ through resistors $R^1$—$R^2$ to afford discharge of the magnet winding 1 and establishment of reverse current therethrough for quick dropping of the load. Switch 4 is additionally provided with normally closed contacts 11 for establishing connection of magnet winding 1 through contacts 7 of switch 2 to an auxiliary discharge circuit including resistor $R^3$.

The winding $4^a$ of switch 4 is of such strength as to be unable to lift switch 4 under the energization afforded by connection of said winding across lines $L^1$—$L^2$ through resistors $R^1$, $R^2$ as aforedescribed, but is of sufficient strength to seal and hold switch 4 if otherwise actuated to closed position. Accordingly, a mechanical interlock 12 between switches 2 and 4 preferably is provided so that movement of switch 2 upon energization of its winding $2^a$ results in lifting of switch 4, but upon dropping out of switch 2, switch 4 will remain sealed under normal conditions, as will hereinafter appear. As will be obvious to those skilled in the art, in lieu of the mechanical interlock 12, switch 4 might be provided with an additional winding connected in series with winding $2^a$ of switch 2 to afford the desired interlocking of switches 2 and 4.

The function and operation of the aforedescribed controller will now be more fully described. To energize the magnet for lifting, master switch 3 is moved to closed position, thus energizing switch 2 by a circuit extending from line $L^1$ through winding $2^a$, through master switch 3 to line $L^2$. Upon response of switch 2, magnet winding 1 is energized by a circuit extending from line $L^1$ through contacts 5 of switch 2 to terminal $T^1$ of the magnet winding, through said magnet winding to terminal $T^2$ and thence through contacts 6 of switch 2 to line $L^2$.

Response of switch 2 has meanwhile, through the mechanical interlock 12 aforedescribed, lifted switch 4, and its coil $4^a$ is sufficiently energized to seal and hold said switch in such position, i. e., with contacts 9 and 10 thereof closed, and contact 11 open.

To release the load carried by the lifting magnet, master switch 3 is moved to open position to interrupt the aforedescribed energizing circuit for switch 2. Switch 2 then drops out to interrupt the aforedescribed energizing circuit for magnet winding 1 and for closure of contacts 7 and 8 to connect said winding 1 for discharge thereof. Switch 4, meanwhile, under normal conditions, remains in its lifted position. Thus there is established a reverse current discharge circuit for magnet winding 1 from terminal $T^1$ through contacts 7 of switch 2, conductor 13, through contacts 10 of switch 4 and thence through resistor $R^2$ to line $L^2$, and also from magnet terminal $T^2$ through contacts 8 of switch 2, conductor 14, through contacts 9 of switch 4 and thence through resistor $R^1$ to line $L^1$. Coil $4^a$ of switch 4 is at this juncture connected in the aforementioned reverse current discharge circuit in parallel with magnet winding 1.

Thus upon dropping out of switch 2, the line connections for the magnet are reversed, and as is well known the induced voltage of the magnet winding will then oppose and exceed the voltage of supply circuit $L^1$—$L^2$ and the magnet winding will thus act to supply current to said supply circuit through resistors $R^1$—$R^2$. After a predetermined interval determined by the magnet and the value of discharge resistors $R^1$ and $R^2$, the discharge voltage of magnet winding 1 drops below the voltage of supply circuit $L^1$—$L^2$ and current is then supplied from said supply circuit to said magnet winding in reverse direction. The current now begins to build up in the reverse direction and the terminal voltage at the magnet drops, and at a predetermined value allows switch 4 to drop out, such dropping out point being calculated to occur about the time the flux in the magnetic circuit is reversed by the reverse current to demagnetize the load and drop it from the magnet. The reverse power connections are thus interrupted to prevent building up of the flux in reverse direction and the magnet is completely disconnected from $L^1$, $L^2$, the source of supply.

If, on the other hand, at the time master switch 3 is opened to deenergize switch 2 as aforedescribed, either of the resistors $R^1$ or $R^2$ have failed, thus breaking the aforedescribed main discharge circuit, switch 4 being unenergized will drop out along with switch 2 and contacts 11 of switch 4 will be closed. In that event an auxiliary discharge circuit for magnet winding 1 will be afforded from terminal $T^1$ through contacts 7 of switch 2, conductor 13, through contacts 11 of switch 4 and thence through auxiliary discharge resistor $R^3$ to terminal $T^2$ of the magnet.

As will be apparent, automatic establishment of the aforedescribed auxiliary discharge circuit upon such failure of the main or reverse current discharge circuit will prevent the destructive effect of induced voltages in the magnet winding. However, it will be noted that the auxiliary discharge circuit, including resistor $R^3$, while it affords the desired protection to the magnet and controller, does not establish a reverse current throgh the magnet winding, so that the magnet winding will discharge slowly through resistor $R^3$ and the magnetic flux accordingly will decay relatively slowly, thus affording a dropping time for the load many multiples of that ordinarily experienced. This delay in dropping of the load will warn the operator that the main discharge circuit of the magnet is open and in need of repair. However, the operator may, even under those conditions, continue to use the magnet with safety, the auxiliary discharge circuit affording the necessary protection against inductive loads in the magnet. Accordingly, the magnet need not be out of service until such time as the main discharge circuit can be repaired.

I claim:

1. The combination with an inductive winding, a supply circuit, a resistor, circuit making and breaking contacts, energizing connections for said inductive winding extending from said supply circuit through certain of said contacts, reverse discharge connections between said inductive winding and said supply circuit through certain of said contacts and through said resistor, and auxiliary discharge connections extending across the terminals of said inductive winding through certain of said contacts, of means to effect break of said discharge connections by certain of said contacts throughout the period of making and maintaining said energizing connections and to effect making of said discharge connections through said resistor by certain of said contacts upon break of said energizing connections by certain of said contacts, said means controlling make of said auxiliary discharge connections and rendering make thereof automatic when discharge of said inductive winding through the first mentioned discharge connections is defeated by failure of said resistor included therein.

2. The combination with an inductive winding, a supply circuit, a resistor, circuit making and breaking contacts, energizing connections for said inductive winding extending from said supply circuit through certain of said contacts, reverse discharge connections between said inductive winding and said supply circuit through certain of said contacts and through said resistor, and auxiliary discharge connections extending across the terminals of said inductive winding through certain of said contacts, of means to effect break of said discharge connections by certain of said contacts throughout the period of making and maintaining said energizing connections and to effect making of said discharge connections through said resistor by certain of said contacts upon break of said energizing connections by certain of said contacts, said means controlling make of said auxiliary discharge connections and rendering make thereof automatic when discharge of said inductive winding through the first mentioned discharge connections is defeated by failure of said resistor included therein, failure of said resistor being non-interfering with energization of said inductive winding during disablement of said resistor and said means in such circumstances protecting said inductive winding by effecting make of said auxiliary discharge connections upon interruption of said energizing connections, said auxiliary discharge connections affording only relatively slow demagnetization of said inductive winding and thereby its use in lieu of the first-mentioned discharge connections indicating disablement of said resistor.

3. In combination, an inductive winding, a supply circuit, resistors, a control winding connected between said resistors and connected therethrough across said supply circuit, circuit making and breaking contacts, energizing connections for said inductive winding from said supply circuit through certain of said contacts, discharge connections through certain of said contacts and said resistors from said inductive winding to said supply circuit placing in parallel said control winding and said inductive winding, auxiliary discharge connections across the terminals of said inductive winding through certain of said contacts, and means controlling said contacts and insuring break of said discharge connections throughout the period of making and maintaining said energizing connections, said means upon effecting break of said energizing connections effecting make of the first mentioned discharge connections, said control winding controlling certain of said contacts to delay make of said auxiliary discharge connections while the first mentioned discharge connections are effective, failure of either of said resistors effecting through deenergization of said control winding quick substitution of said auxiliary discharge connections for the disabled first-mentioned discharge connections.

4. In combination, an inductive winding, a supply circuit, resistors, a control winding connected between said resistors and connected therethrough across said supply circuit, circuit making and breaking contacts, energizing connections for said inductive winding from said supply circuit through certain of said contacts, discharge connections through certain of said contacts and said resistors from said inductive winding to said supply circuit placing in parallel said control winding and said inductive winding, auxiliary discharge connections across the terminals of said inductive winding through certain of said contacts, and means controlling said contacts and insuring break of said discharge connections throughout the period of making and maintaining said energizing connections, said means upon effecting break of said energizing connections effecting make of the first mentioned discharge connections and placing the same under the control of said control winding for automatic break governed by the electrical condition of said inductive winding, said control winding also controlling certain of said contacts to time make of said auxiliary discharge connections with break of the first-mentioned discharge connections as aforesaid and to effect make of said auxiliary discharge circuit as the result of failure of either of said resistors.

5. In combination, an inductive winding, a supply circuit, resistors, a control winding connected between said resistors and connected therethrough across said supply circuit, circuit making and breaking contacts, energizing connections for said inductive winding from said supply circuit through certain of said contacts, discharge connections through certain of said contacts and said resistors from said inductive winding to said supply circuit placing in parallel said control winding and said inductive winding, auxiliary discharge connections across the terminals of said inductive winding through certain of said contacts, and means controlling said contacts and insuring break of said discharge connections throughout the period of making and maintaining said energizing connections, said means upon effecting break of said energizing connections effecting make of the first mentioned discharge connections and placing the same under the control of said control winding for automatic break governed by the electrical condition of said inductive winding, said control winding also controlling certain of said contacts to time make of said auxiliary discharge connections with break of the first-mentioned discharge connections as aforesaid and to effect make of said auxiliary discharge circuit as the result of failure of either of said resistors, said contacts being controllable by said means to energize said inductive winding despite such resistor failure and to effect immediate make of said auxiliary discharge connections upon break of the energizing connections, indication of resistor failure then being furnished by relatively slow demagnetization of said inductive winding by discharge through said auxiliary discharge connections.

6. In a controller for connecting an inductive winding to a power circuit and for controlling the discharge of the winding when deenergizing the same, in combination, switching means comprising a plurality of sets of contacts some of which are of the normally closed type while others are of the normally open type, said switching means being operable from an off position to an on position with actuation of all of said sets of contacts and having a restraining coil for restraining certain of said sets of contacts against actuation while other sets unrestrained thereby are restored to initial condition, energizing connections for the inductive winding completed by certain of said sets of contacts upon movement of said switching means to on position and interrupted upon restoration to initial position of the unrestrained sets of contacts, reverse power connections established for the inductive winding by certain of said restrained sets of contacts and certain of said unrestrained sets of contacts when restored to initial position, said reverse power connections having a connection including said restraining coil in electrical parallel relation with said reverse connections, and a discharge loop for the inductive winding which is completed by certain of the contacts in the restrained and unrestrained groups but only when they are in their initial positions.

7. In a controller for connecting an inductive winding to a power circuit and for controlling the discharge of the winding when deenergizing the same, in combination, switching means comprising a plurality of sets of contacts some of which are of the normally closed type while others are of the normally open type, said switching means being operable from an off position to an on position with actuation of all of said sets of contacts and having a restraining coil for restraining certain of said sets of contacts against actuation while other sets unrestrained thereby are restored to initial condition, energizing connections for the inductive winding completed by certain of said sets of contacts upon movement of said switching means to on position and interrupted upon restoration to initial position of the unrestrained sets of contacts, reverse power connections, including series resistors, completed for the inductive winding by certain of said restrained sets of contacts and certain of said unrestrained sets of contacts when restored to initial position, said restraining coil having connections interposing it between said resistors and said reverse connections interposing the inductive winding between said resistors in parallel with said restraining coil while said reverse power connections are complete, and a discharge loop for the inductive winding which is completed by certain of said sets of contacts in the restrained and unrestrained groups but only when they are in their initial positions.

8. In a controller for connecting an inductive winding to a power circuit and for controlling the discharge of the winding when deenergizing the same, in combination, switching means comprising a plurality of sets of contacts some of which are of the normally closed type while others are of the normally open type, said switching means being operable from an off position to an on position with actuation of all of said sets of contacts and having a restraining coil for restraining certain of said sets of contacts against actuation while other sets unrestrained thereby are restored to initial condition, energizing connections for the inductive winding completed by certain of said contacts upon movement of said switching means to on position and interrupted upon restoration to initial position of the unrestrained sets of contacts, reverse power connections, including a pair of series resistors, completed for the inductive winding by certain of said restrained sets of contacts and certain of said unrestrained sets of contacts when restored to initial position, said resistors with said restraining coil therebetween having series connection across the power supply and said reverse connections placing the inductive winding between said resistors in parallel with said restraining winding, and a discharge loop for the winding which is completed by certain of said sets of contacts in the restrained and unrestrained groups but only when they are in their initial positions.

9. In a controller for connecting an inductive winding to a power circuit and for controlling the discharge of the winding when deenergizing the same, the combination of first and second groups of contact sets each of which groups includes a normally open and a normally closed set of contacts and is responsive to electromagnetic means to operate from an off position to an on position, energizing connections for the inductive winding completed upon movement of said first group of contact sets to on position and interrupted upon restoration thereof to off position, reverse power connections established for the inductive winding upon restoration of said first group of contact sets to its off position while said second group of contact sets is in the on position, said reverse power connections including means for restoring said second group of contact sets to its off position, and a discharge loop for the inductive winding completed upon restoration of said second group of contact sets to its off position.

10. In a controller for connecting an inductive winding to a power circuit and for controlling the discharge of the winding when deenergizing the same, the combination of first and second groups of contact sets each of which groups of contact sets includes a normally open and a normally closed set of contacts, said first group of contact sets being responsive to electromagnetic means to operate from an off position to an on position, said second group of contact sets being responsive to movement from off position to on position of said first group of contact sets to move from a first position to a second position, means for restraining said second group of contact sets from restoration to its first position while said first group of contact sets is returned to its off position, energizing connections for the inductive winding completed upon movement of said first group of contact sets to on position and interrupted upon restoration thereof to its off position, reverse power connections, including said restraining means, established for the inductive winding upon restoration of said first group of contact sets to its off position while said second group of contact sets is in its second position, and a discharge loop for the inductive winding completed upon restoration of said second group of contact sets to its first position.

References Cited in the file of this patent

UNITED STATES PATENTS

| | | |
|---|---|---|
| 957,334 | Henderson | May 10, 1910 |
| 1,923,311 | Hodgson | Aug. 22, 1933 |
| 2,126,775 | Hodgson | Aug. 16, 1938 |
| 2,206,823 | Wertz | July 2, 1940 |
| 2,390,377 | Lilquist | Dec. 4, 1945 |

UNITED STATES PATENT OFFICE

CERTIFICATE OF CORRECTION

Patent No. 2,841,747                                      July 1, 1958

Howard E. Hodgson

It is hereby certified that error appears in the above numbered patent requiring correction and that the said Letters Patent should read as corrected below.

In the grant, lines 1, 2 and 3, for "Howard E. Hodgson, of Wauwatosa, Wisconsin," read -- Howard E. Hodgson, of Wauwatosa, Wisconsin, assignor to Cutler-Hammer, Inc., of Milwaukee, Wisconsin, a corporation of Delaware, --; line 12, for "Howard E. Hodgson, his heirs" read -- Cutler-Hammer, Inc., its successors --; in the heading to the printed specification, line 3, for "Howard E. Hodgson, Wauwatosa, Wis." read -- Howard E. Hodgson, Wauwatosa, Wis., assignor to Cutler-Hammer, Inc., Milwaukee, Wis., a corporation of Delaware --.

Signed and sealed this 4th day of November 1958.

(SEAL)
Attest:

KARL H. AXLINE                                                ROBERT C. WATSON
Attesting Officer                                      Commissioner of Patents